United States Patent Office
3,274,272
Patented Sept. 20, 1966

3,274,272
PROCESS FOR THE PRODUCTION OF CYCLO-
HEXENE AND METHYLCYCLOHEXENE
Masataka Amagasa, Komegafukuro, Uwacho, Sendai-shi,
Japan, and Tadashi Yamaguchi, Nakajima-cho, Sendai-shi, Japan
No Drawing. Filed July 23, 1963, Ser. No. 296,927
Claims priority, application Japan, July 28, 1962,
37/31,927, 37/31,929
18 Claims. (Cl. 260—666)

The present invention relates to a process for the hydrogenation of aromatic hydrocarbons. An essential object of the present invention is to provide a process for production of a substance which is represented by the structural formula, viz.

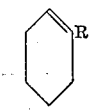

(Here, R is hydrogene or methyl group), from a substance which is represented by the structural formula, viz.

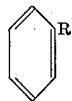

(here, R is hydrogen or methyl group), by use of at least one substance selected from the group consisting of alkali metals and alkaline earth metals as a reducing agent in liquid ammonia in the presence or absence of a proton donor as a decomposing agent.

Hereinafter,

is called as cyclohexene,

as methylcyclohexene, and

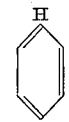

is called as benzene,

as toluene.

In short, the present invention is to provide a process for the selective production of cyclohexene or methylcyclohexene which cannot be obtained easily by the conventional catalytic reduction methods or other reducing methods.

It is known that liquid ammonia dissolves many organic and inorganic compounds and is a solvent having quite peculiar properties. Various reactions having many characteristics have been found in liquid ammonia. (Refer to "Non-Aqueous Solvent" (1953), by Audriuch and Kleinberg; Kagaku to Kogyo, "Organic Chemistry Utilizing Liquid Ammonia," 9, 15 (1956), by Amagasa: "Organic Chemistry Utilizing Liquid Ammonia" (1956) by Shimo.) Above all, liquid ammonia dissolves remarkably well alkali metals or alkaline earth metals to form a blue liquid ammonia solution. There are many interesting reactions utilizing the said solution. The present inventors have studied organic chemistry utilizing liquid ammonia and its applications during the past 25 years or so. The present invention is based on one part of their studies.

Many examples of reducing organic or inorganic compounds by use of an alkali metal or alkaline earth metal (a reducing agent) solution in liquid ammonia have been known. A few examples of applying a metallic sodium-liquid ammonia solution together with a decomposing agent to the reduction of benezene

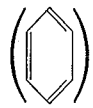

or toluene are known (refer to U.S. Patent No. 2,182,242 of Wooster; Recueil, 67, 85 (1948) by Wibaut; Ber., 88, 338 (1955), Huckel et al.; Birch, J.C.S., 1947, 1642). However, in these cases

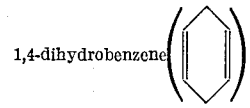

or dihydrotoluene alone is obtained as the object. In these cases methylalcohol, or ethylalcohol is used as the decomposing agent in an amount of the equivalent or more for metallic sodium as the reducing agent.

As a result of studies, the present inventors have found that cyclohexene

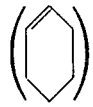

or methylcyclohexene alone may be produced selectively by one effort by use of a decomposing agent of an amount less than the equivalent to that of the reducing agent. This novel reaction method has been overlooked in conventional reduction methods which are carried out by use of an alkali metal or alkaline earth metal in liquid ammonia in the presence of a decomposing agent. The finding of this new fact is very significant for the basic reaction and its applications of such a reaction system. When a system of liquid ammonia-benzene-reducing agent or liquid ammonia-toluene-reducing agent is heated in the absence of a decomposing agent, one part of the liquid ammonia itself acts as a decomposing agent and in accordance with the conditions dihydrobenzene or cyclohexene.

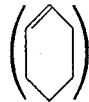

dihydrotoluene or methylcyclohexene may be selectively obtained respectively.

Three isomers are known in regard to methylcyclohexene. According to the process of the present invention, only

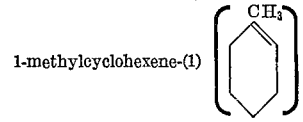

or a mixture of 1-methylcyclohexene-(1) 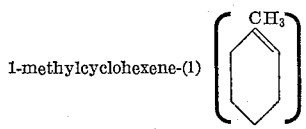

and 1-methylcyclohexene-(3) 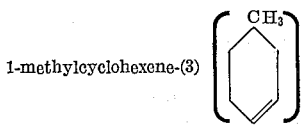

may be freely produced in accordance with the conditions.

As the reducing agent, alkali metals such as lithium, sodium, and potassium and alkaline earth metals such as calcium, strontium and barium can be respectively used. However, in view of solubility and practicality, sodium is excellent. As the decomposing agents, water, alcohols and so-called ammono acids may be used, as long as they become proton donors in liquid ammonia. However, from the commercial point of view, water is most advantageously used, because after the completion of reaction, NaOH or KOH may be easily separated and recovered when water is used as the decomposing agent.

Example I

Into a 500 cc. pressure-resisting cylindrical vessel equipped with a stirrer, which is provided at the upper portion thereof with a valve A for exhausting gas and introducing liquid, and a device B for pressing alkali metals in, and at the lower portion thereof with a valve C for discharging liquid, 200 cc. of liquid ammonia, 20 g. of benzene, and 18 g. of water were placed. Then, 26 g. of metallic sodium was gradually pressed into the said vessel at 0° C. through the device B while the mixture was stirred. After metallic sodium was fed under a pressure, the mixture was left standing for about 2 hours and ammonia was recovered from the valve A. Thereafter, 200 cc. of water was gradually added into the residue through the valve A and discharged through the valve C. The resulting solution consisted of two liquid phases, so that an oil layer could be easily separated. 19 g. of the oil layer was analyzed by gas chromatography. It was found that 14 g. of cyclohexene was obtained, and the residue was un-reacted benzene. In this case, metallic sodium may be added in the form of a metallic sodium-liquid ammonia solution. The order of addition of the decomposing agent and the reducing agent may be changed. After the completion of the reaction, the formed sodium hydroxide may be recovered by filtration.

Example II 200 cc. of liquid ammonia, 20 g. of benzene and 50 g. of ethylalcohol were placed in a pressure-resisting reaction vessel in the same manner as in Example I. Under stirring, 47 g. of potassium was pressed into the said vessel at 10° C. by the same treatment as in the case of Example 1. After feeding potassium under pressure, the same treatment as in Example I was carried out, and 12 g. of cyclohexene and 6.5 g. of un-reacted benzene were obtained.

Example III

Into a 500 cc. three-necked flask, 200 cc. of liquid ammonia, 20 g. of benzene, and 15 g. of metallic calcium were placed. Under stirring, 40 g. of a 50% methanol solution in liquid ammonia was added dropwise at −40° C. After the completion of the addition, the mixture was left standing for about 5 hours. After recovery of ammonia by means of evaporation, 300 cc. of water was gradually added, and then 18 g. of an oil layer was separated. By analyzing the oil layer, 8 g. of cyclohexene was produced, and 10 g. of benzene was recovered.

Example IV 150 cc. of liquid ammonia, 20 g. of benzene, and 12 g. of metallic sodium were placed in the same pressure-resisting reaction vessel as that employed in Example I and heated at 100° C. for 6 hours. After the resulting reaction, the batch was cooled to room temperature, and then through the valve A, 30 g. of ammonium chloride which had been dissolved in 150 cc. of liquid ammonia was introduced therein. Ammonia was recovered through the valve A. Thereafter, the same treatment as in Example I was carried out, and 6 g. of cyclohexene and 13.4 g. of unreacted benzene were obtained.

Example V

Into the same reaction vessel having pressure resistance as that employed in Example I, 200 cc. of liquid ammonia, 30 g. of benzene, and 30 g. of methylalcohol were placed. Then, 23 g. of metallic sodium was introduced into the said vessel through the device B under pressure with stirring. The same treatment as in the case of Example I was carried out, whereby 16 g. of cyclohexene was obtained, and 13 g. of benzene was recovered.

Example VI

Into the same reaction vessel having pressure resistance as that employed in Example I, 200 cc. of liquid ammonia, 20 g. of toluene, and 16 g. of water were placed, and 24 g. of metallic sodium at 0° C. was added gradually thereto with stirring. After the metallic sodium was pressed into the vessel, the mixture was left standing at 40° C. for about 4 hours. Thereafter, ammonia was recovered through the valve A. 200 cc. of water was gradually added into the residue through the valve A and then removed from the exhaustion valve C. The resulting solution consisted of two liquid phases, so that an oil layer could be easily separated. 19 g. of the oil layer was analyzed by means of gas-chromatography and 12 g. of 1-methylcyclohexene-(1) 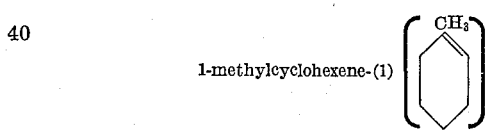

was obtained. The residue was unreacted toluene. In this case, metallic sodium dissolved in liquid ammonia may be added. The order of addition of a decomposing agent and a reducing agent may be reversed. After completion of the reaction, the formed sodium hydroxide may be previously filtered off or it may be recovered by distilling off all of the liquid.

Example VII

The same treatment as in the case of Example I was carried out, except that after pressing metallic sodium into the vessel, the mixture was left standing at 0° C. for about 2 hours. 7 g. of 1-methylcyclohexene-(1) 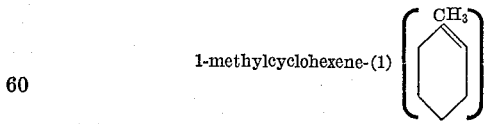

and 5 g. of 1-methylcyclohexene-(3) 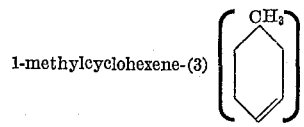

were obtained, and 7 g. of toluene was recovered.

Example VIII 200 cc. of liquid ammonia, 20 g. of toluene and 50 g. of ethyl alcohol were placed in the same pressure-resisting reaction vessel as that employed in Example I. Under stirring, 17 g. of potassium was pressed therein at 10° C. by the same treatment as in the case of Example I. After pressing potassium in, the same treatment as in the case of Example I was carried out. 14 g. of 1-methylcyclohexene-(1) 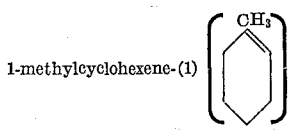

and 5.5 g. of un-reacted toluene were obtained.

*Example IX*

Into 500 cc. of a three-necked flask, 200 cc. of liquid ammonia, 20 g. of toluene and 15 g. of metallic calcium were placed, and 40 g. of a 50% methanol solution in liquid ammonia was gradually dropped at −40° C. with stirring into the mixture. After completion of dropping, the mixture was left standing for 5 hours. After ammonia was recovered by evaporation, 300 cc. of water was gradually added. Thereafter, two liquid phases were separated, and 5 g. of 1-methylcyclohexene-(1) 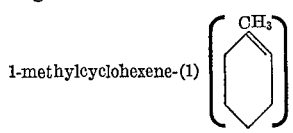

3.5 g. of 1-methylcyclohexene-(3) 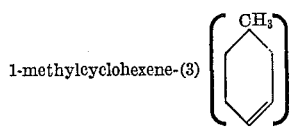

and 10.7 g. of toluene were obtained from the divided oil layer.

*Example X*

150 cc. of liquid ammonia, 20 g. of toluene, and 10 g. of metallic sodium were placed into the same pressure-resisting vessels as that employed in Example I. The mixture was heated at 100° C. and reacted for 8 hours in the absence of a decomposing agent. After completion of the reaction, the temperature was lowered to the room temperature. Then, through the valve A a solution consisting of 25 g. of ammonium chloride and 150 cc. of liquid ammonia was fed thereinto. Ammonia was recovered from the valve A and thereafter the same treatment as in the case of Example I was carried out. 7 g. of 1-methylcyclohexene-(1) 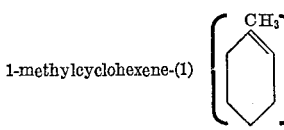

and 12.4 g. of toluene were obtained.

As described above, the present invention relates to a process for producing easily and selectively cyclohexene

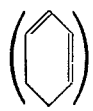

from benzene or methylcyclohexene from toluene with good yield by utilizing skillfully the reaction mechanism of liquid ammonia, a reducing agent, and a decomposing agent, said cyclohexene and methylcyclohexene not having been easily obtained by conventional methods. Therefore, the present invention effectively contributes to the progress of the petroleum chemical industry field utilizing cyclohexene or methylcyclohexene. Accordingly, it will be observed that the present invention is a very useful invention.

What is claimed is:

1. A process for the production of cyclohexene which consists essentially of: admixing liquid ammonia, a substance selected from the group consisting of alkali metals and alkaline earth metals, and benzene; and subjecting the mixture to reduction.

2. A process for the production of methylcyclohexene which consists essentially of: admixing liquid ammonia, a substance selected from the group consisting of alkali metals and alkaline earth metals, and toluene; and subjecting the mixture to reduction.

3. A process for the production of cyclohexene which consists essentially of: adding to a liquid ammonia solution of benzene a substance selected from the group consisting of alkali metals, alkaline earth metals, liquid ammonia solutions of alkali metals, and liquid ammonia solutions of alkaline earth metals, to form a mixture; and subjecting the mixture to reduction.

4. A process for the production of methylcyclohexene which consists essentially of: adding to a liquid ammonia solution of toluene a substance selected from the group consisting of alkali metals, alkaline earth metals, liquid ammonia solutions of alkali metals, and liquid ammonia solutions of alkaline earth metals, to form a mixture; and subjecting the mixture to reduction.

5. A process for the production of cyclohexene which consists essentially of: admixing liquid ammonia, a substance selected from the group consisting of alkali metals and alkaline earth metals, benzene, and a less than equivalent amount of a proton donor with respect to said alkali metals and alkaline earth metals; and subjecting the mixture to reduction.

6. A process for the production of methylcyclohexene which consists essentially of: admixing liquid ammonia, a substance selected from the group consisting of alkali metals and alkaline earth metals, toluene, and a less than equivalent amount of a proton donor with respect to said alkali metals and alkaline earth metals; and subjecting the mixture to reduction.

7. A process for the production of cyclohexene which consists essentially of: adding a substance selected from the group consisting of alkali metals, alkaline earth metals, liquid ammonia solutions of alkali metals, and liquid ammonia solutions of alkaline earth metals to a liquid ammonia solution of benzene and a less than equivalent amount of a proton donor with respect to said alkali metals and alkaline earth metals.

8. A process for the production of methylcyclohexene which consists essentially of: adding a substance selected from the group consisting of alkali metals, alkaline earth metals, liquid ammonia solutions of alkali metals, and liquid ammonia solutions of alkaline earth metals to a liquid ammonia solution of toluene and a less than equivalent amount of a protron donor with respect to said alkali metals and alkaline earth metals.

9. A process for the production of cyclohexene which consists essentially of: admixing with a liquid ammonia solution containing benzene and a substance selected from the group consisting of alkali metals and alkaline earth metals a less than equivalent amount of a proton donor with respect to said alkali metals and alkaline earth metals; and subjecting the mixture to reduction.

10. A process for the production of methylcyclohexene which consists essentially of: admixing with a liquid ammonia solution containing toluene and a substance selected from the group consisting of alkali metals and alkaline earth metals a less than equivalent amount of a proton donor with respect to said alkali metals and alkaline earth metals; and subjecting the mixture to reduction.

11. A process according to claim 5, wherein the proton donor is selected from the group consisting of water, alcohols and ammono acids.

12. A process according to claim 6, wherein the proton donor is selected from the group consisting of water, alcohols and ammono acids.

13. A process according to claim 7, wherein the proton donor is added in the form of its liquid ammonia solution.

14. A process according to claim 7, wherein the proton donor is selected from the group consisting of water, alcohols and ammono acids.

15. A process according to claim 8, wherein the proton donor is added in the form of its liquid ammonia solution.

16. A process according to claim 8, wherein the proton donor is selected from the group consisting of water, alcohols and ammono acids.

17. A process according to claim 9, wherein the proton donor is selected from the group consisting of water, alcohols and ammono acids.

18. A process according to claim 10, wherein the proton donor is selected from the group consisting of water, alcohols and ammono acids.

References Cited by the Examiner

UNITED STATES PATENTS 2,182,242 12/1939 Wooster _____ 260—667
2,432,843 12/1947 Whitman _____ 260—666

OTHER REFERENCES

A. P. Krapcho et al., J. Am. Chem. Soc., 81, pp. 3658–3666, July 20, 1959.

DELBERT E. GANTZ, *Primary Examiner.*

V. O'KEEFE, *Assistant Examiner.*